(12) United States Patent
Colacecchi et al.

(10) Patent No.: US 11,040,764 B1
(45) Date of Patent: Jun. 22, 2021

(54) VEHICLE WINDOW ASSEMBLY INCLUDING A SHADE HAVING AN ILLUMINATION

(71) Applicant: THE BOEING COMPANY, Chicago, IL (US)

(72) Inventors: Jay W. Colacecchi, Lake Stevens, WA (US); Phillip E. Pacini, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/815,363

(22) Filed: Mar. 11, 2020

(51) Int. Cl.
| | |
|---|---|
| *F21V 21/00* | (2006.01) |
| *B64C 1/14* | (2006.01) |
| *B60Q 3/208* | (2017.01) |
| *B60Q 3/57* | (2017.01) |
| *B60J 1/20* | (2006.01) |
| *E06B 9/78* | (2006.01) |
| *E06B 9/42* | (2006.01) |
| *E06B 9/264* | (2006.01) |

(52) U.S. Cl.
CPC ........... *B64C 1/1484* (2013.01); *B60J 1/2011* (2013.01); *B60J 1/2044* (2013.01); *B60J 1/2052* (2013.01); *B60J 1/2063* (2013.01); *B60J 1/2075* (2013.01); *B60J 1/2083* (2013.01); *B60Q 3/208* (2017.02); *B60Q 3/57* (2017.02); *E06B 9/78* (2013.01); *E06B 2009/2643* (2013.01); *E06B 2009/425* (2013.01)

(58) Field of Classification Search
CPC ..... B64C 1/1484; B64C 1/1476; B60Q 3/208; B60Q 3/57; B60J 1/2011; B60J 1/2052; B60J 1/2044; B60J 1/2075; B60J 1/2083; B60J 1/2063; E06B 2009/2643; E06B 2009/425; E06B 9/78
USPC ........................ 244/129.3; 362/471, 488, 503
See application file for complete search history.

(56) References Cited

U.S. PATENT DOCUMENTS

| | | | | |
|---|---|---|---|---|
| 3,691,686 | A * | 9/1972 | Donegan | ................... E06B 3/44 49/56 |
| 7,510,146 | B2 * | 3/2009 | Golden | ................. B64C 1/1484 244/129.3 |
| 2012/0256052 | A1 * | 10/2012 | Becker | .................. B64C 1/1492 244/129.3 |
| 2014/0140080 | A1 * | 5/2014 | Mohat | ................... B64C 1/1492 362/471 |
| 2015/0354790 | A1 * | 12/2015 | Ash | ........................ B64D 47/02 362/471 |
| 2016/0137282 | A1 * | 5/2016 | Hontz | ....................... E06B 9/24 244/129.3 |
| 2020/0087978 | A1 * | 3/2020 | Switzer | ..................... E06B 9/24 |

\* cited by examiner

*Primary Examiner* — Laura K Tso
(74) *Attorney, Agent, or Firm* — The Small Patent Law Group LLC; Joseph M. Butscher (57) ABSTRACT

A window assembly for a vehicle includes a frame, one or more panes secured to the frame, and a shade movably coupled to the frame. The shade is configured to be moved between an open position and a closed position. The shade includes an illuminator that is configured to allow ambient light from outside of the vehicle to pass through and illuminate the illuminator.

20 Claims, 6 Drawing Sheets

VEHICLE WINDOW ASSEMBLY INCLUDING A SHADE HAVING AN ILLUMINATION

FIELD OF EMBODIMENTS OF THE DISCLOSURE

Embodiments of the present disclosure generally relate to a window assembly of a vehicle, such as a commercial aircraft, and more particularly to a window assembly including a shade having an illumination.

BACKGROUND OF THE DISCLOSURE

Window assemblies are secured to a fuselage of a commercial aircraft. Each window assembly includes one or more window panes, such as an acrylic window pane, secured to a window frame, which is secured to the fuselage.

When an aircraft is parked at a gate, for example, attendants often close the shades of the window assemblies to block sunlight from entering an internal cabin and increasing the temperature within the internal cabin. Accordingly, the internal cabin may be dimmed by the closed shades.

Additionally, an internal cabin may include various decorative features on walls, a ceiling, and the floor, for example. The decorative features may be illuminated with light assemblies.

As can be appreciated, the light assemblies include various mounted components, such as lights and wiring that connect to a power source, that are installed during a manufacturing process. Therefore, the process of installing the light assemblies adds time to the overall manufacturing process. Moreover, the light assemblies add cost. Further, the light assemblies add weight to an aircraft, which may adversely affect fuel efficiency. In general, adding light assemblies to a vehicle, such as a commercial aircraft, increases manufacturing time and costs, as well as weight of the vehicle.

SUMMARY OF THE DISCLOSURE

A need exists for a window assembly for a vehicle that provides an illuminated feature when the shade is in a closed position. Further, a need exists for a window assembly that is configured to have an illuminated portion without using a separate light assembly.

With those needs in mind, certain embodiments of the present disclosure provide a window assembly for a vehicle. The window assembly includes a frame, one or more panes secured to the frame, and a shade movably coupled to the frame. The shade is configured to be moved between an open position and a closed position. The shade includes an illuminator that is configured to allow ambient light from outside of the vehicle to pass through and illuminate the illuminator.

In at least one embodiment, the shade includes a handle configured to be grasped to move the shade between the open position and the closed position. As one example, the handle includes the illuminator. As another example, the illuminator forms the handle.

The illuminator may be clear and transparent. The illuminator may be colored.

In at least one embodiment, the illuminator includes a light collector on a pane side of the shade. The light collector is configured to collect the ambient light. A light emitter is on a cabin side of the shade. The light emitter is configured to emit at least a portion of the ambient light. The illuminator may also include an intermediate body that connects the light collector to the light emitter.

In at least one embodiment, the light collector has a first surface area, and the light emitter has a second surface area. The first surface area may be greater than the second surface area.

The frame may include a blind that covers a face of the illuminator when the shade is in the open position.

The illuminator may include one or both of a graphic or text. The illuminator may be shaped as one or both of a graphic or text. The illuminator may be configured to removably receive and retain a variety of inserts.

Certain embodiments of the present disclosure provide a method of illuminating a portion of a window assembly of a vehicle. The method includes securing one or more panes to a frame; moveably coupling a shade to the frame, wherein said moveably coupling comprises allowing the shade to be moved between an open position and a closed position; and allowing ambient light from outside the vehicle to pass through and illuminate an illuminator of the shade.

Certain embodiments of the present disclosure provide a vehicle including an internal cabin, and a window assembly, as described herein.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a window assembly for a vehicle. The window assembly includes a shade having an illuminator. The illuminator is configured to be illuminated without electricity. Further, the illuminator is configured to be illuminated without the use of a separate light assembly, whether within or on the shade or outside of the shade. In at least one embodiment, the illuminator is part of, or otherwise forms, a handle of the shade. The illuminator is formed of a transparent/translucent material, such as transparent/translucent glass or plastic. The illuminator allows ambient light outside of the vehicle (such as sunlight) to pass therethrough into an internal cabin of a vehicle. In this manner, the illuminator is automatically illuminated without the use of an electrical component, such as a separate light assembly. The clarity, color, and/or density of the illuminator may be varied in order to control the amount, color, and intensity of the light that passes into the internal cabin.

In at least one embodiment, the illuminator is an integrally molded portion of the shade. That is, the illuminator may be integrally molded and formed with the shade. As another example, the illuminator may be affixed to the shade.

As described herein, certain embodiments of the present disclosure provide a window assembly for a vehicle. The window assembly includes a frame, one or more panes secured to the frame, and a shade movably coupled to the frame. The shade is configured to be moved between an open position and a closed position. The shade includes an illuminator that is configured to allow ambient light from outside of the vehicle to pass through and illuminate the illuminator.

Figure 1:
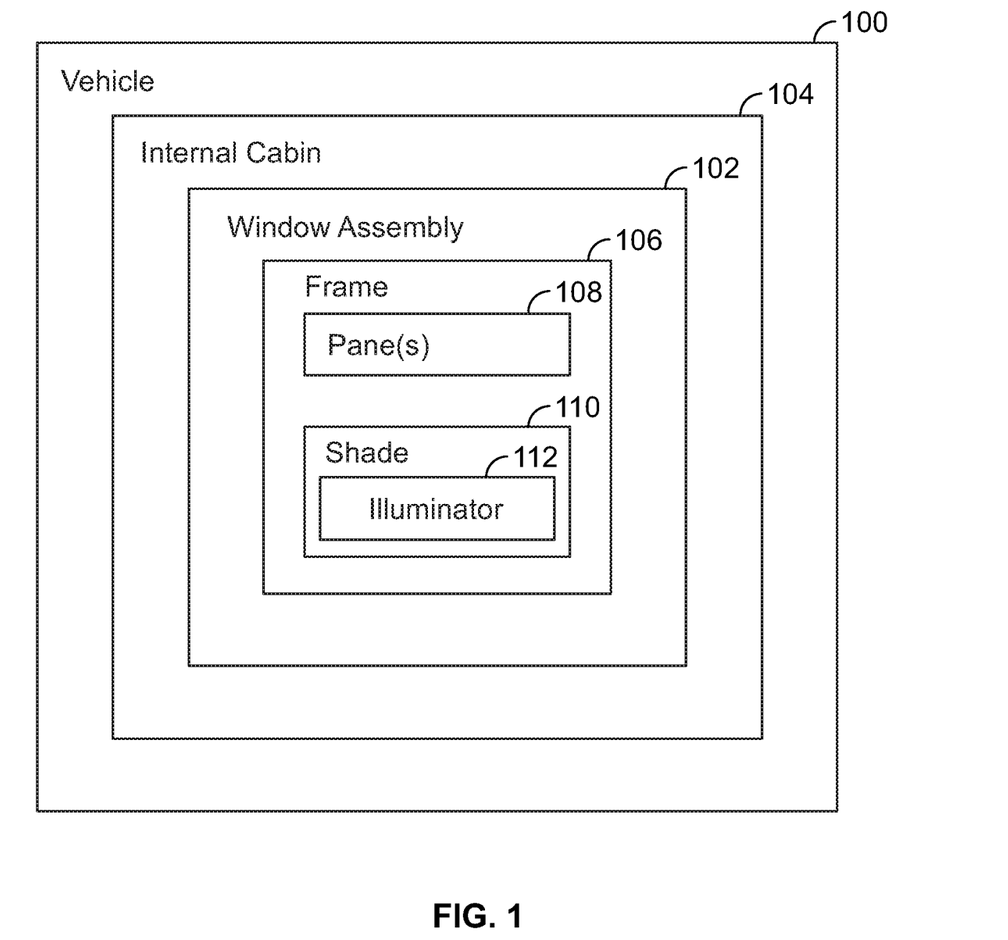
FIG. 1 illustrates a schematic block diagram of a vehicle having a window assembly within an internal cabin, according to an embodiment of the present disclosure.

FIG. 1 illustrates a schematic block diagram of a vehicle 100 having a window assembly 102 within an internal cabin 104, according to an embodiment of the present disclosure. In at least one embodiment, the vehicle 100 is a commercial aircraft. Optionally, the vehicle 100 may be an automobile, bus, locomotive, seacraft, spacecraft, or the like.

The window assembly 102 includes a frame 106. One or more panes 108 are secured within the frame 106. The panes 108 may be clear, transparent structures, such as formed of clear acrylic, glass, or the like.

A shade 110 is moveably secured to the frame 106 within the internal cabin 104. The shade 110 is disposed in relation to an interior side of the pane(s) 108. For example, the shade 110 is disposed on or spaced from the interior side of the pane(s) 108 towards the interior of the internal cabin 104 (in contrast to a side of the pane(s) 108 that faces towards an outside environment in which the vehicle 100 is located).

The shade 110 is configured to be moved between an open position and a closed position. In the open position, the shade 110 is moved in relation to the frame 106 (such as upwardly through the frame) so that the shade 110 does not block the pane(s) 108. In the closed position, the shade 110 overlays the pane(s) 108 so as to block light that passes through the pane(s) 108 from passing into the internal cabin 104.

The shade 110 includes an illuminator 112. In at least one embodiment, the illuminator 112 is part of a handle of the shade 110. For example, the illuminator 112 may be formed in the handle. As an example, the illuminator 112 may be a strip extending through the handle. As another example, the illuminator 112 forms the handle. As another example, the shade 110 may form part of a panel, edge, or the like of the shade 110.

The illuminator 112 is formed of a transparent material that allows at least a portion of light to pass therethrough, thereby illuminating the illuminator 112. In at least one embodiment, the illuminator 112 is formed of a clear transparent material. For example, the illuminator 112 may be formed of the same material as the pane(s) 108. The illuminator 112 may be formed of clear, transparent plastic, glass, or the like. In at least one embodiment, the illuminator 112 is formed of clear acrylic. As another example, the illuminator 112 may be formed of clear polyester resin, polycarbonate, or the like. In at least one embodiment, the illuminator 112 may be formed of a colored or filtered transparent material. For example, the illuminator 112 may be colored red, orange, yellow, green, blue, indigo, violet, or mixtures thereof.

The illuminator 112 is not coupled to an electrical source, or to a separate and distinct light assembly. Instead, the illuminator 112 is configured to allow ambient light outside of the vehicle 100 to pass therethrough into the internal cabin 104, thereby providing automatic, natural illumination of a portion of the shade 110 without the need for, and costs associated with, an additional light assembly.

Figure 2:
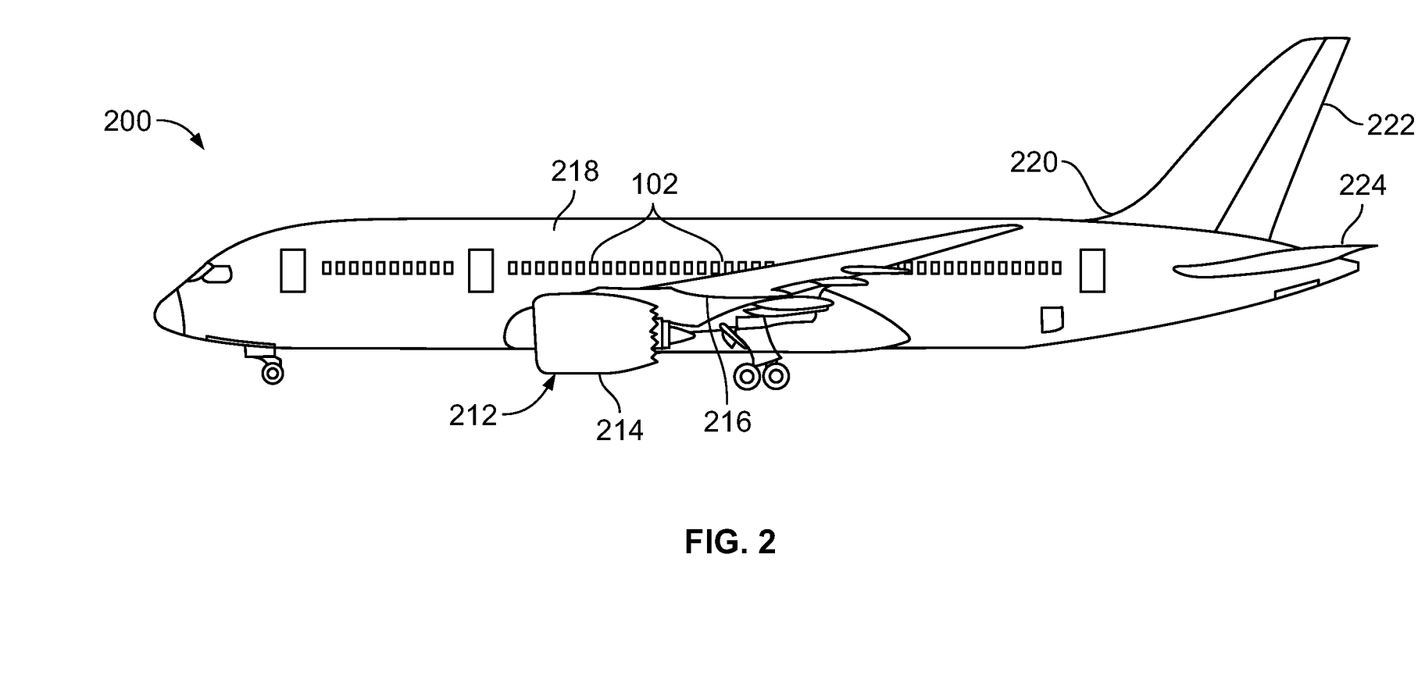
FIG. 2 illustrates a lateral view of an aircraft, according to an embodiment of the present disclosure.

FIG. 2 illustrates a lateral view of an aircraft 200, according to an embodiment of the present disclosure. The aircraft 200 is an example of the vehicle 100, shown in FIG. 1. The aircraft 200 includes a propulsion system 212 that may include two engines 214, for example. Optionally, the propulsion system 212 may include more engines 214 than shown. The engines 214 are carried by wings 216 of the aircraft 200. In other embodiments, the engines 214 may be carried by a fuselage 218 and/or an empennage 220. The empennage 220 may also support horizontal stabilizers 222 and a vertical stabilizer 224.

The aircraft 10 also includes a plurality of window assemblies 102, such as the window assemblies of FIG. 1. The window assemblies 102 are secured to the fuselage 218.

Referring to FIGS. 1 and 2, ambient light outside of the aircraft 200 (such as sunlight) passes into the internal cabin 104 through the window assemblies 102.

Alternatively, instead of an aircraft, embodiments of the present disclosure may be used with various other vehicles, such as automobiles, buses, locomotives and train cars, seacraft, spacecraft, and the like.

Figure 3:
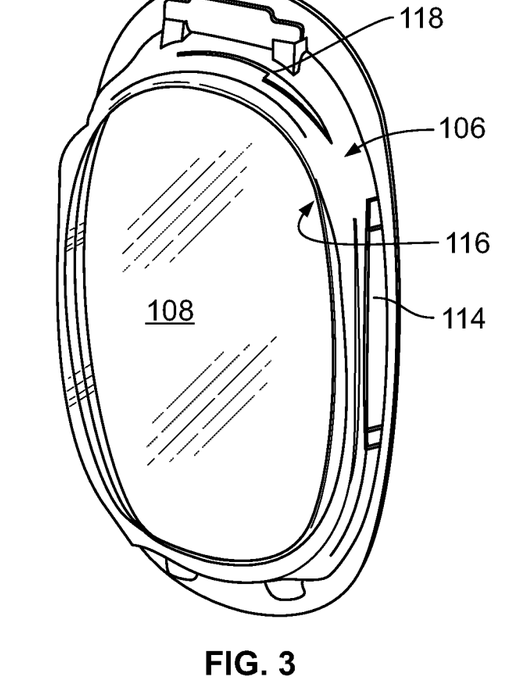
FIG. 3 illustrates a perspective view of a frame, according to an embodiment of the present disclosure.

FIG. 3 illustrates a perspective view of the frame 106, according to an embodiment of the present disclosure. The frame 106 includes an outer perimeter rim 114 defining an interior passage 116. The window pane(s) 108 are secured by the perimeter rim 114 within the interior passage 116. A shade track 118 is formed in the perimeter rim 114. The shade track 118 allows the shade 110 (shown in FIG. 1) to move relative to the frame 106 between an open position and a closed position. For example, the shade track 118 includes one or more slots, channels, passages, or the like that slidably retain portions of the shade 110.

Figure 4:
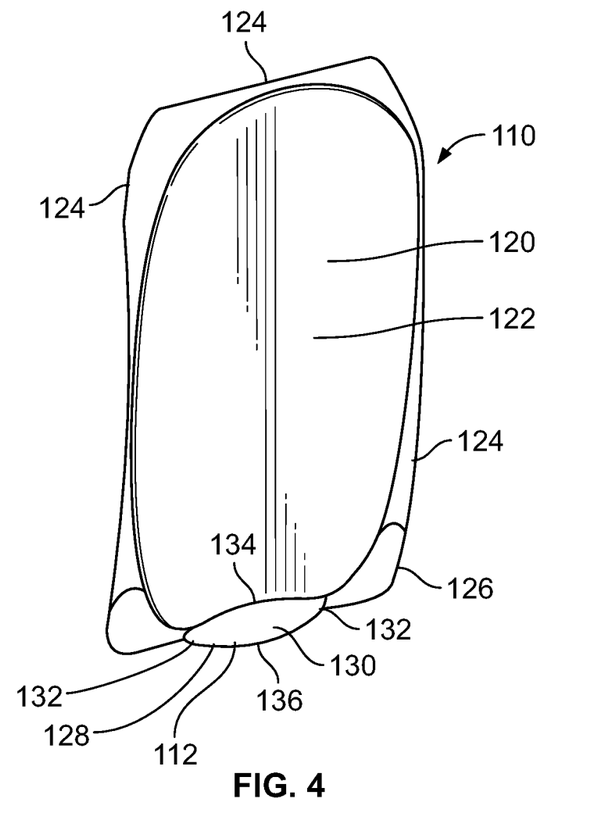
FIG. 4 illustrates a perspective view of a shade, according to an embodiment of the present disclosure.

FIG. 4 illustrates a perspective view of the shade 110, according to an embodiment of the present disclosure. The shade 110 includes a panel 120 having a main body 122 and exterior edges 124. The main body 122 and the exterior edges 124 may be formed of an opaque or partially-opaque material, such as an opaque plastic. The exterior edges 124 are configured to be slidably retained within the shade track 118 (shown in FIG. 3) when the shade is in the closed position.

A bottom end 126 of the shade 110 includes a handle 128, which is configured to be grasped by an individual to move the shade 110 between the open position and the closed position. The handle 128 includes a protuberance 130 that outwardly extends into and towards the internal cabin 104 (shown in FIG. 1). The protuberance 130 extends between opposite sides 132, a top 134, and bottom 136 of the handle 128. Optionally, the handle 128 may be sized and shaped differently than shown.

In at least one embodiment, the handle 128 includes the illuminator 112. For example, the illuminator 112 may be formed through a portion of the handle 128, such as between the sides 132. The illuminator 112 is a transparent portion of the handle 128. For example, the illuminator 112 may be a transparent strip formed through the handle 128 bounded by opaque portions of the handle 128. In at least one other embodiment, the illuminator 112 may form an entirety of the handle 128. The illuminator 112 may form the handle 128 as a transparent piece of glass or plastic. The illuminator 112 may be formed of a solid, contiguous piece of transparent material. Optionally, the illuminator 112 may be formed as a hollow piece of transparent material. In at least one other embodiment, the illuminator 112 may be an open space that allows light to pass therethrough.

In at least one other embodiment, the illuminator 112 may be disposed on other portions of the shade 110. For example, the illuminator 112 may be formed on the bottom end 126 above or to a side of the handle 128. As another example, the illuminator 112 may be disposed on the main body 122 proximate to an exterior edge 124. As another example, the illuminator 112 may provide an interior perimeter of the main body 122 inboard from the exterior edges 124.

Figure 5:
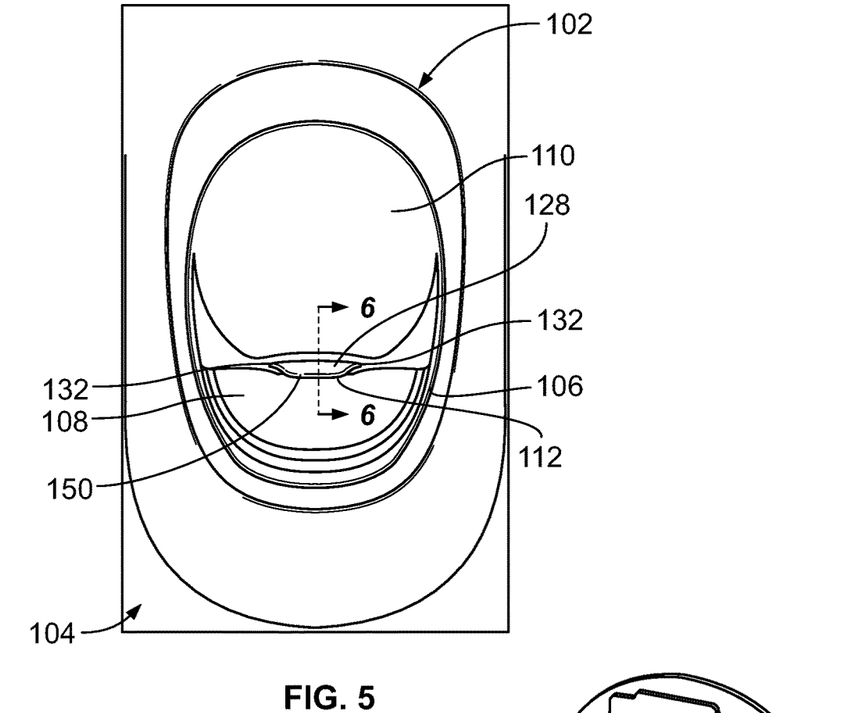
FIG. 5 illustrates a front view of the window assembly viewed from within the internal cabin, according to an embodiment of the present disclosure.

FIG. 5 illustrates a front view of the window assembly 102 viewed from within the internal cabin 104, according to an embodiment of the present disclosure. As shown in FIG. 5, the shade 110 is in a partially open position, which is between the closed position and the open position.

The illuminator 112 may be a longitudinal transparent strip 150 that extends between the sides 132 of the handle 128. The transparent strip 150 is bounded by opaque material of the handle 128 above the transparent strip 150.

Figure 6:
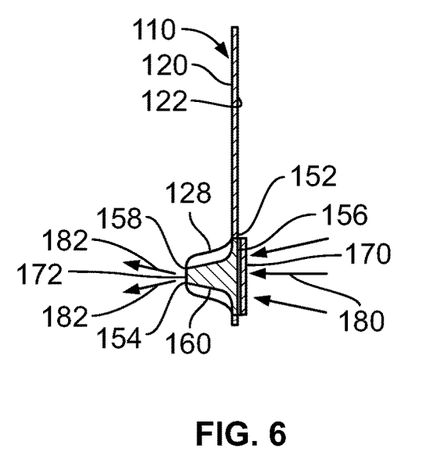
FIG. 6 illustrates a cross-sectional view of the shade through line 6-6 of FIG. 5, according to an embodiment of the present disclosure.

FIG. 6 illustrates a cross-sectional view of the shade 110 through line 6-6 of FIG. 5, according to an embodiment of the present disclosure. The illuminator 112 includes contiguous transparent material, such as transparent plastic or glass, that extends from a pane side 152 (which faces the pane(s) 108, shown in FIG. 5) of the handle 128 to a cabin side 154 (which faces the internal cabin 104, shown in FIG. 5).

The illuminator 112 includes a light collector 156 at the pane side 152 and a light emitter 158 at the cabin side 154. The light collector 156 connects to the light emitter 158 through an intermediate body 160. The entirety of the illuminator 112 may be formed of a contiguous transparent material, such as transparent glass or plastic, that extends from the light collector 156 to the light emitter 158 through the intermediate body 160. Optionally, the illuminator 112 may not include the intermediate body 160. Instead, a space may be disposed between the light collector 156 and the light emitter 158. As another option, the illuminator 112 may include only the light collector 156 or the light emitter 158 with open space on opposite ends thereof.

As shown, the light collector 156 has a first surface area 170, and the light emitter 158 has a second surface area 172. The first surface area 170 is greater than the second surface area 172. As such, the light collector 156 is larger than the light emitter 158. As shown, the size of the illuminator 112 may decrease from the light collector 156 to the light emitter 158. In this manner, ambient light 180 collected by the light collector 156 is concentrated and refracted by the illuminator 112 and light 182 that passes out of the light emitter 158 into the internal cabin 104 may be desirably focused or otherwise concentrated. Optionally, the illuminator 112 may be the same size throughout. For example, the light collector 156 and the light emitter 158 may have the same surface area.

Figure 7:
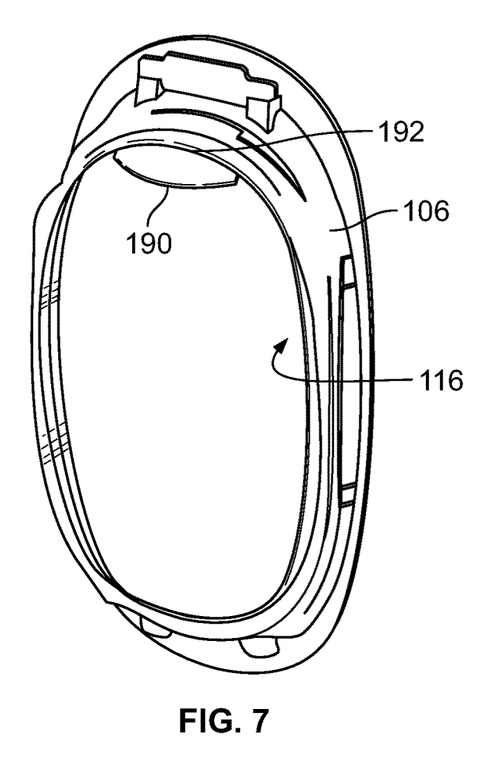
FIG. 7 illustrates a perspective view of the frame, according to an embodiment of the present disclosure.

FIG. 7 illustrates a perspective view of the frame 106, according to an embodiment of the present disclosure. In this embodiment, an optional opaque blind 190 is positioned within the interior passage 116 at the top 192 of the frame 106. The blind 190 may be sized and shaped similar to the illuminator 112. Referring to FIGS. 1, 4 and 7, when the shade 110 is in the open position, the blind 190 covers the face of the illuminator 112 that faces the internal cabin 104, thereby blocking light from passing through the illuminator 112 into the internal cabin 104. As the shade 110 is pulled down to expose the illuminator 112, the blind 190 no longer covers the illuminator 112, and light may pass through the illuminator 112 into the internal cabin 104. By selectively opening and closing the shade 110, the blind 190 provides an ON and OFF effect in relation to the illuminator 112.

Figure 8:
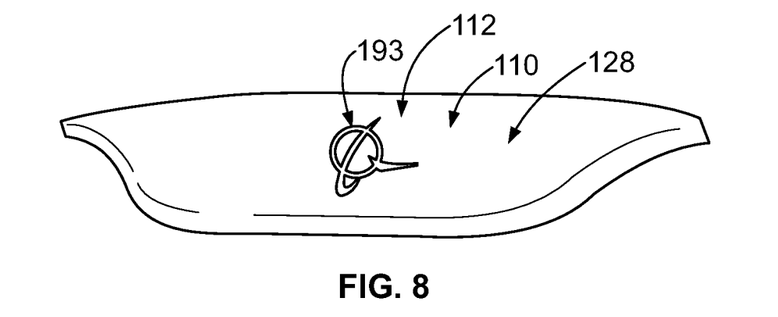
FIG. 8 illustrates a front view of a handle of the shade, according to an embodiment of the present disclosure.

FIG. 8 illustrates a front view of the handle 128 of the shade 110, according to an embodiment of the present disclosure. The handle 128 (or other portions of the shade 110) may include a graphic 193, such as a company logo. In at least one embodiment, the handle 128 is formed as the illuminator 112, thereby providing an illuminated graphic 193, which provides a desirable aesthetic and/or branding opportunity, for example, within the internal cabin 104 (shown in FIG. 1). In at least one embodiment, the illuminator 112 is shaped as the graphic 193, with the remainder of the handle 128 being opaque or semi-opaque.

Figure 9:
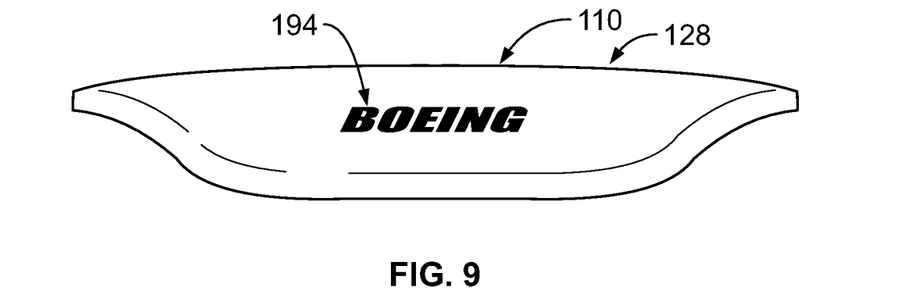
FIG. 9 illustrates a front view of a handle of the shade, according to an embodiment of the present disclosure.

FIG. 9 illustrates a front view of a handle of the shade, according to an embodiment of the present disclosure. The handle 128 (or other portions of the shade 110) may include text 194, such as a company name, a message (such as how to operate the shade), an advertisement, and/or the like. In at least one embodiment, the handle 128 is formed as the illuminator 112, thereby providing an illuminated text 194, which provides a desirable message and/or branding opportunity, for example, within the internal cabin 104 (shown in FIG. 1). In at least one embodiment, the illuminator 112 is shaped as the text 194, with the remainder of the handle 128 being opaque or semi-opaque.

Referring to FIGS. 1-9, the illuminator 112 is transparent and allows at least a portion of ambient light outside of vehicle to pass into the internal cabin 104. The illuminator 112 may be clear and transparent. In at least one other embodiment, the illuminator 112 may be colored.

Figure 10:
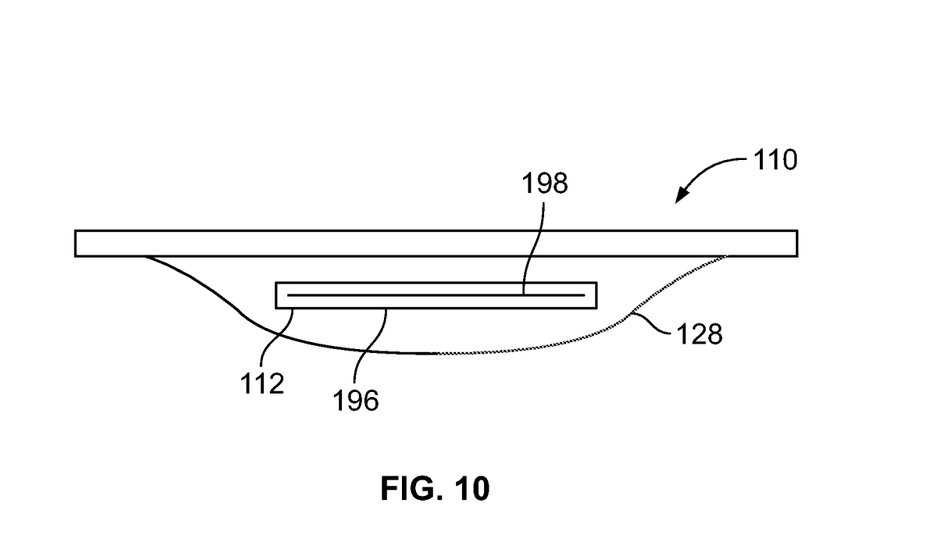
FIG. 10 illustrates a top view of the shade, according to an embodiment of the present disclosure.

FIG. 10 illustrates a top view of the shade 110, according to an embodiment of the present disclosure. In at least one embodiment, the illuminator 112 may be an open space formed through a portion of the shade 110, such as through the handle 128. A channel 196 may be formed through a top portion of the handle 128 and connect to the open space of the illuminator 112. The channel 196 is configured to receive and retain one or more inserts 198. Each insert 198 may be transparent, whether clear, colored, or filtered. The inserts 198 may have particular colors, graphics, and/or texts. In this manner, different inserts may be selectively removed and inserted to provide different light effects, such as different colored lighting, illuminated graphics, texts, and/or the like. As such, the illuminator 112 may be configured to removably receive and retain a variety of inserts.

Figure 11:
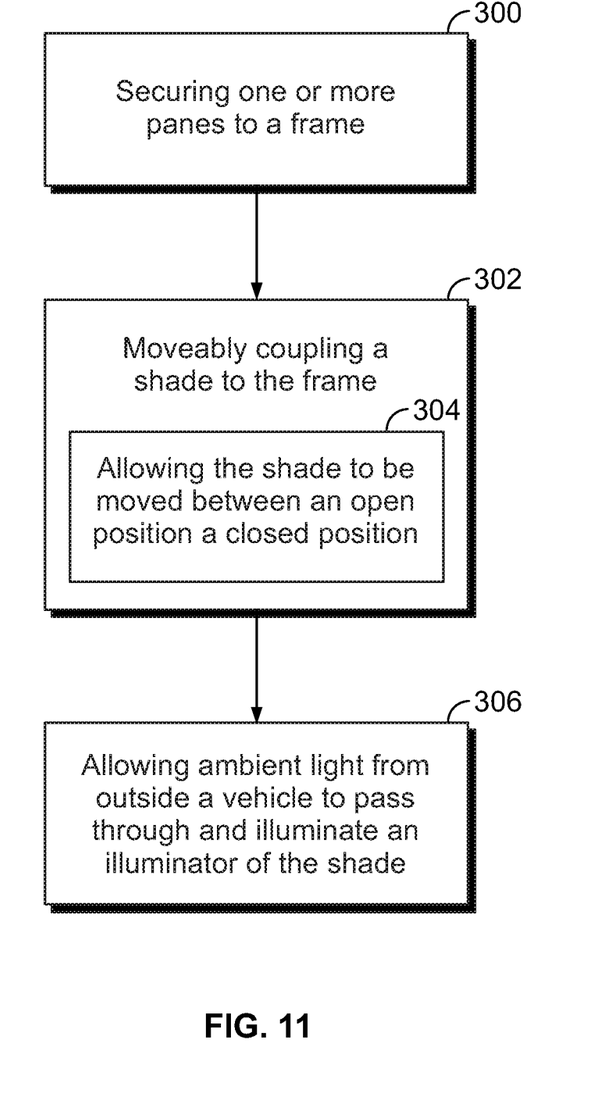
FIG. 11 illustrates a flow chart of a method of illuminating a portion of a window assembly of a vehicle.

FIG. 11 illustrates a flow chart of a method of illuminating a portion of a window assembly of a vehicle. The method includes securing (300) one or more panes to a frame, moveably coupling (302) a shade to the frame, wherein said moveably coupling includes allowing (304) the shade to be moved between an open position and a closed position, and allowing (306) ambient light from outside the vehicle to pass through and illuminate an illuminator of the shade.

As described herein, embodiments of the present disclosure provide non-intrusive, non-electrical systems and methods for illuminating portions of a shade of window assembly, such as within a vehicle. The window assembly includes an illuminator that allows ambient light outside of the vehicle to pass therethrough and into an internal cabin. The light illuminates the illuminator. The amount of ambient light that passes through the illuminator may be managed through control of clarity, color, and density of the illuminator.

Available space and complexity within an internal cabin of a commercial aircraft often limits opportunities for illuminated aesthetic features and branding opportunities. Designing and certifying electrical illuminated features is costly and time consuming. Embodiments of the present disclosure provide illuminators of shades that provide multiple opportunities for aesthetically-pleasing light effects, branding opportunities, illuminated graphics, and the like without incurring the costs and complexities of electrical solutions. Further, embodiments of the present disclosure provide illuminators that offer branding opportunities, for example, at each and every row of seating within a vehicle.

As described herein, embodiments of the present disclosure provide a window assembly of a vehicle that provides an illuminated feature when the shade is in a closed position. Further, embodiments of the present disclosure provide a window assembly that is configured to have an illuminated portion without using a separate light assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A window assembly for a vehicle, the window assembly comprising:
   a frame;
   one or more panes secured to the frame; and
   a shade movably coupled to the frame, wherein the shade is configured to be moved between an open position and a closed position, wherein the shade comprises an illuminator that is configured to allow ambient light from outside of the vehicle to pass through and illuminate the illuminator.

2. The window assembly of claim 1, wherein the shade comprises a handle configured to be grasped to move the shade between the open position and the closed position.

3. The window assembly of claim 2, wherein the handle comprises the illuminator.

4. The window assembly of claim 2, wherein the illuminator forms the handle.

5. The window assembly of claim 1, wherein the illuminator is clear and transparent.

6. The window assembly of claim 1, wherein the illuminator is colored.

7. The window assembly of claim 1, wherein the illuminator comprises:
   a light collector on a pane side of the shade, wherein the light collector is configured to collect the ambient light; and
   a light emitter on a cabin side of the shade, and wherein the light emitter is configured to emit at least a portion of the ambient light.

8. The window assembly of claim 7, wherein the illuminator further comprises an intermediate body that connects the light collector to the light emitter.

9. The window assembly of claim 7, wherein the light collector has a first surface area, and the light emitter has a second surface area, and wherein the first surface area is greater than the second surface area.

10. The window assembly of claim 1, wherein the frame comprises a blind that covers a face of the illuminator when the shade is in the open position.

11. The window assembly of claim 1, wherein the illuminator comprises one or both of a graphic or text.

12. The window assembly of claim 1, wherein the illuminator is shaped as one or both of a graphic or text.

13. The window assembly of claim 1, wherein the illuminator is configured to removably receive and retain a variety of inserts.

14. A method of illuminating a portion of a window assembly of a vehicle, the method comprising:
   securing one or more panes to a frame;
   moveably coupling a shade to the frame, wherein said moveably coupling comprises allowing the shade to be moved between an open position and a closed position; and
   allowing ambient light from outside the vehicle to pass through and illuminate an illuminator of the shade.

15. The method of claim 14, further comprising providing the illuminator on a handle of the shade.

16. The method of claim 14, further comprising forming the illuminator as a handle of the shade.

17. The method of claim 14, further comprising covering a face of the illuminator when the shade is in the open position with a blind of the frame.

18. The method of claim 14, further comprising providing one or both of a graphic or text on the illuminator.

19. The method of claim 14, further comprising shaping the illuminator as one or both of a graphic or text.

20. A vehicle comprising:
   an internal cabin; and
   a window assembly comprising:
      a frame;
      one or more panes secured to the frame; and
      a shade movably coupled to the frame, wherein the shade is configured to be moved between an open position and a closed position, wherein the shade comprises an illuminator that is configured to allow ambient light from outside of the vehicle to pass through and illuminate the illuminator.

* * * * *